Nov. 7, 1939.        I. J. NOVAK        2,178,604

DRYING OIL AND METHOD OF PREPARING SAME

Filed July 31, 1936        6 Sheets-Sheet 1

Fig. 1.

Blow No. - RT-1-35
Temperature of Blowing - 50°C.
Type of Oil - Alkali-refined linseed oil Graph Showing Refractive Index (o); Oxygen Content (x);
Iodine Value (▲) and Viscosity (□) vs. Days Blown

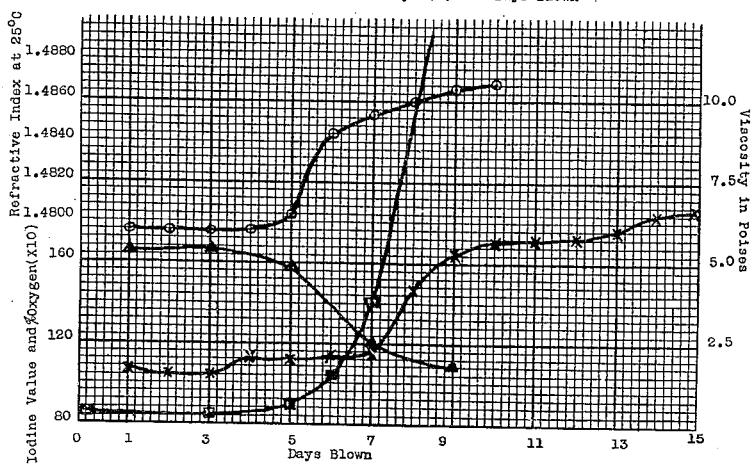

Fig. 2.

Blow No. - RT-2-35
Temperature of Blowing - 25°C.
Type of Oil - Alkali refired linseed Graph Showing Refractive Index (o); Oxygen Content (x); Iodine
Value (▲); Viscosity (□) and Heat of Combustion (⊙) vs. Hours
Blown

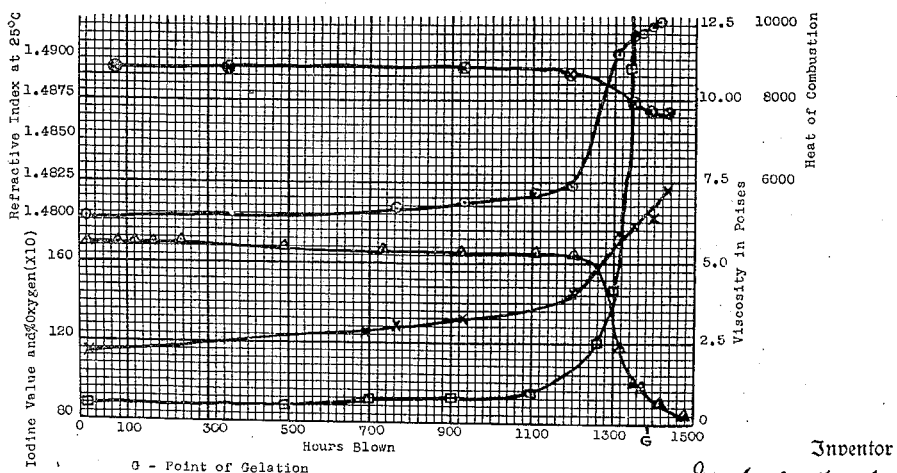

G - Point of Gelation

Inventor
Izador J. Novak
Lee J. Gary

Attorney

Fig. 3.

Blow No. - KO-2-1
Temperature of Blowing - 42°C.
Type of Oil - Alkali-refined Linseed Oil
Solvent Characteristics - Good above Refractive Indices of 1.4840

Graph showing Refractive Index at 25°C. vs. Hours Blown

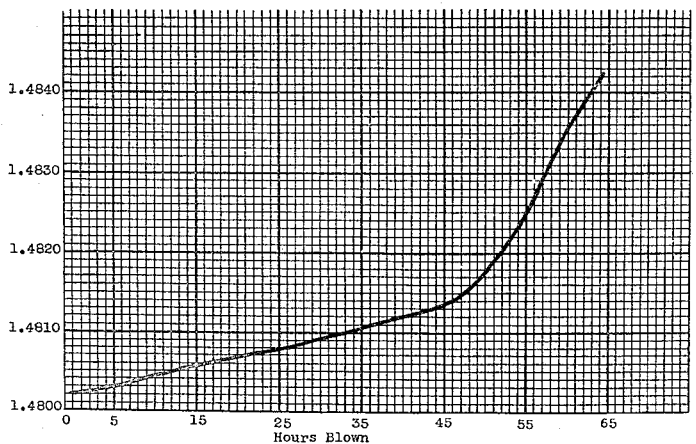

Fig 4.

Blow No. - Ko-3-122
Temperature of Blowing - 68°C. to bleach point, 45°C. from bleach point to end of blow.
Type of Oil - Raw Linseed Oil with Break Removed
Solvent Characteristics - Good above refractive indices of 1.4845

Graph showing Refractive Index at 25°C. vs. Hours Blown

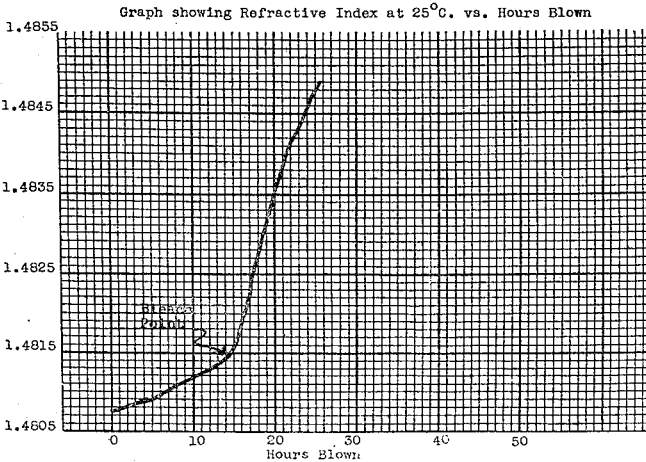

Nov. 7, 1939.  I. J. NOVAK  2,178,604

DRYING OIL AND METHOD OF PREPARING SAME

Filed July 31, 1936  6 Sheets-Sheet 3

Fig. 5

Blow No. - KO-3-76
Temperature of Blowing - 60°C. up to bleach point, 40° from bleach point to end of blow.
Type of Oil - Alkali-refined Linseed Oil
Solvent Characteristics - Good above refractive Indices of 1.4845

Graph showing Refractive Index at 25°C. vs. Hours Blown

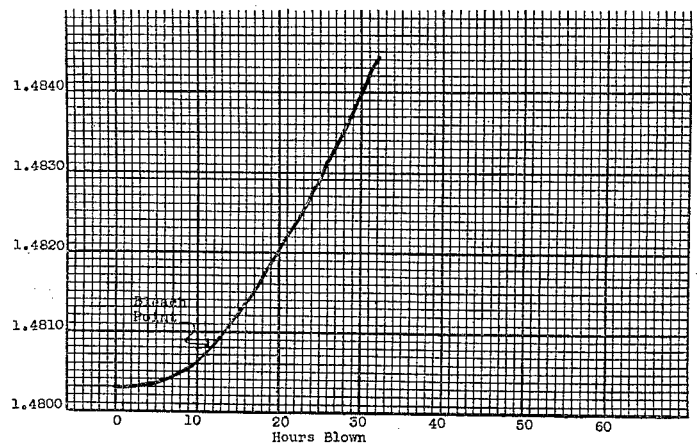

Fig. 6.

Blow No. - KO-3-49
Temperature of Blowing - 40°C.
Type of Oil - Raw Linseed Oil
Solvent Characteristics - Good at refractive indices above 1.4848

Graph showing Refractive Index at 25°C. vs. Hours Blown

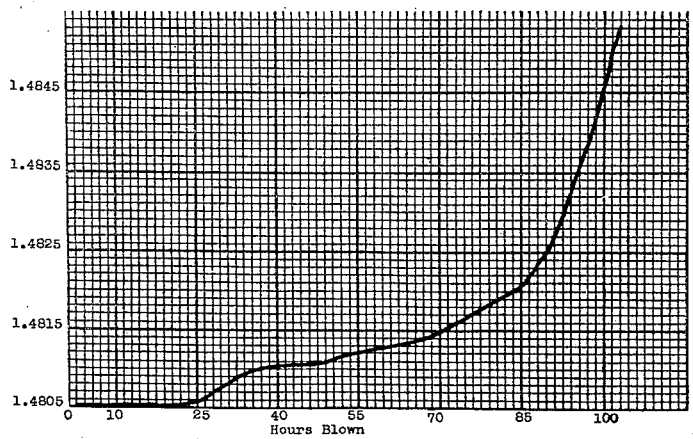

Inventor
Izador J Novak
Lee J Gary
Attorney

Fig. 7.

Blow No. - KO-3-31
Temperature of Blowing - 40°C.
Type of Oil - Raw Linseed Oil with break removed by steam heating
Solvent Characteristics - Good above Refractive Indices of 1.4843

Graph showing Refractive Index at 25°C. vs. Hours Blown

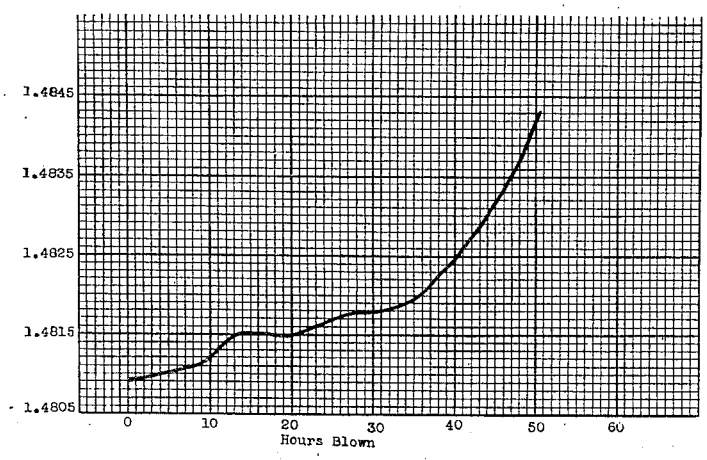

Fig. 8.

Blow No. - L-1-36
Type of Oil - Pilchard Oil
Temperature of Blowing - 45°C.
Solvent Characteristics - Good above refractive indices of 1.4870

Graph showing Refractive Index at 25°C. vs. Hours Blown

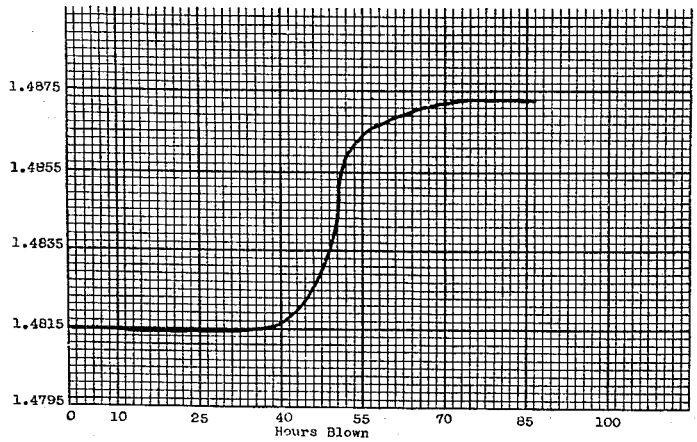

Inventor
Izador J. Novak.
Lee J. Gary
Attorney

Nov. 7, 1939.    I. J. NOVAK    2,178,604

DRYING OIL AND METHOD OF PREPARING SAME

Filed July 31, 1936    6 Sheets-Sheet 5

Fig. 9.

Blow No. - L-2-36
Type of Oil - Hempseed Oil
Temperature of Blowing - 45°C.
Solvent Characteristics - Good above Refractive Indices of 1.4830

Graph showing Refractive Index at 25°C. vs. Hours Blown

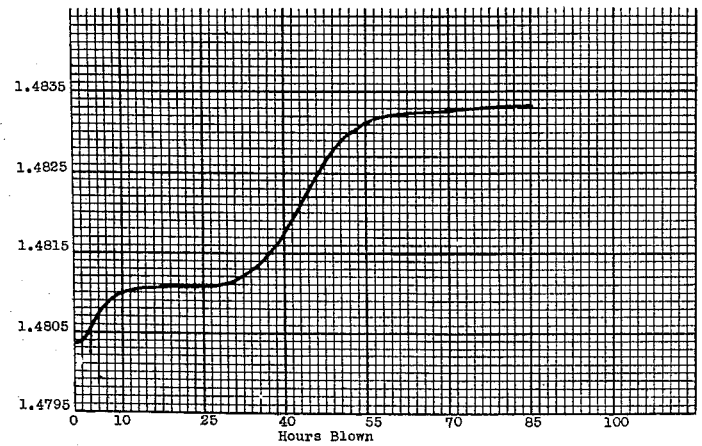

Fig. 10.

Blow No. - CH-I-1
Temperature of Blowing - 41°-45°C.
Type of Oil - Perilla Oil with break removed
Solvent Characteristics - Good above refractive index of 1.4890

Graph showing Refractive Index at 25°C. vs. Hours Blown

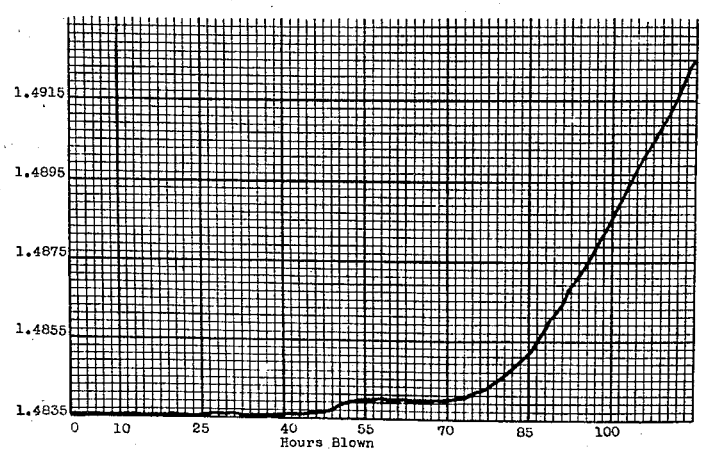

Inventor

Izador J. Novak.
Lee J. Gary
Attorney

Fig. 11.

Blow No. - CH-I-9
Temperature of Blowing - 37°-64°C., mean about 52°C.
Type of Oil - Light Pressed Menhadden
Solvent Characteristics - Good at refractive indices
above 1.4862

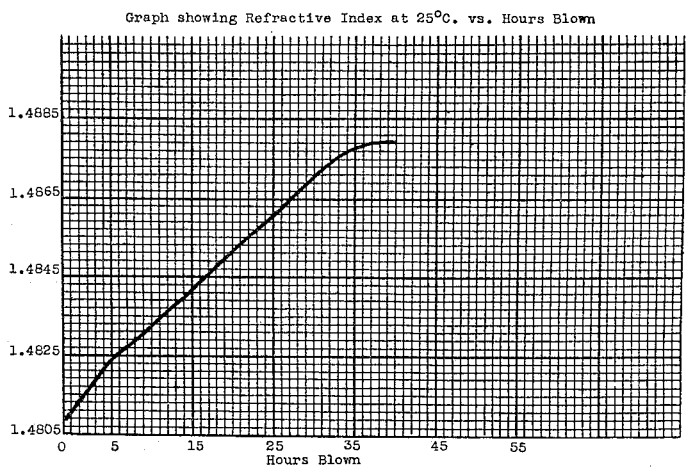

Graph showing Refractive Index at 25°C. vs. Hours Blown

Fig. 12.

Blow No. - KO-I-94a
Temperature of Blowing - 40°C.
Type of Oil - Refined soya bean oil
Solvent Characteristics - Good above refractive index
of 1.4881

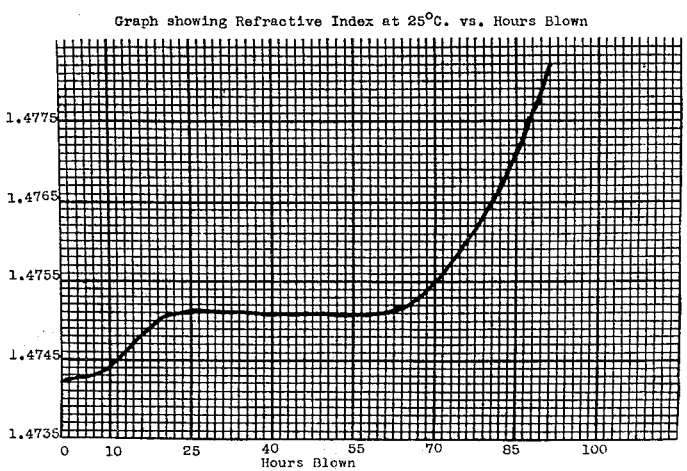

Graph showing Refractive Index at 25°C. vs. Hours Blown

Patented Nov. 7, 1939

2,178,604

UNITED STATES PATENT OFFICE 2,178,604

DRYING OIL AND METHOD OF PREPARING SAME

Izador J. Novak, Bridgeport, Conn., assignor to Raybestos-Manhattan, Inc., Bridgeport, Conn., a corporation of New Jersey Application July 31, 1936, Serial No. 93,617

12 Claims. (Cl. 260—406)

This invention relates to a drying oil and method of preparing same, and more particularly to the production of drying oils having conjugated systems from those having non-conjugated systems.

Tung and related oils have specific solubility characteristics attributable to conjugated molecular systems as distinguished from the straight chain triglyceride configurations of linseed and related oils. Tung oil has well-known valuable and characteristic properties such as heat polymerization, resin solubility and film formation. However, commercially, tung oil has been an unsatisfactory raw material because of its lack of uniformity and availability.

One of the objects of the present invention is to treat drying oils of the straight chain or non-conjugated type so as to produce conjugated systems having properties similar to those of tung oil.

Conjugated systems have the following properties: (1) Higher refractive index than the non-conjugated isomer; (2) Lower heat of combustion than the non-conjugated isomer; (3) A slower rate of reaction with halogenating agents; (4) Conjugated systems react with maleic anhydride, whereas non-conjugated systems do not.

The oil I have produced is shown to be conjugated by all of the above tests, and its similarity in chemical properties in comparison with tung oil, which has a conjugated system, further substantiates this.

Certain of the properties of oils produced by the present invention as well as conditions of treatment of the oils in accordance with the present invention are indicated in the accompanying drawings, of which:

Fig. 1 is a graph showing the refractive index, oxygen content, iodine value, and viscosity of an alkali refined linseed oil blown at 50° C. plotted against the days blown, so as to show the relation of the various properties of the oil to the refractive index.

Fig. 2 is a similar graph of an alkali refined linseed oil blown at a lower temperature for a longer period of time and also showing the heat of combustion.

Fig. 3 is a graph showing the relation of the refractive index of an alkali refined linseed oil to the time of blowing at 42° C.

Fig. 4 is a similar graph for a raw linseed oil with the break removed and blown at a relatively high temperature to the bleach point and then at a lower temperature.

Fig. 5 is a similar graph for an alkali refined linseed oil blown at a relatively high and then lower temperature.

Fig. 6 is a similar graph for a raw linseed oil blown at 40° C.

Fig. 7 is a similar graph for a raw linseed oil with the break removed by steam heating and blown at 40° C.

Fig. 8 is a similar graph for pilchard oil blown at 45° C.

Fig. 9 is a similar graph for hempseed oil blown at 45° C.

Fig. 10 is a similar graph for perilla oil with the break removed and blown at 41 to 45° C.

Fig. 11 is a similar graph for light pressed menhaden oil blown at a mean temperature of 52° C.; and Fig. 12 is a similar graph for refined soya bean oil blown at 40° C.

Method of preparation

Drying and semi-drying oils, such as a refined linseed oil from which the mucilaginous material has been removed but which has not been subjected to heat treatment, are blown with humid air passed through a suitable diffuser at a temperature of 65° to 70° C. until the oil shows a distinct lightening in color, which I call "the bleach point", which may take approximately twelve hours. I prefer to use humid air because I have found that it produces the desired effect more quickly than when relatively dry air is used. During this period, there is a relatively slow rise of the refractive index, which I have adopted as a measure of the index of the conjugation, since it parallels the other characteristic conjugation effects.

When the oil reaches the bleach point, the temperature of the oil is reduced to 40° to 45° C. by reduction of the external heat or by cooling and the blowing continued to a rise of at least .0040 over the original index of refraction as determined by the Abbé Refractometer. The oil at this point has the characteristics of conjugated systems described above.

The above procedure produces a viscosity greater than that of the original oil and usually less than tung oil, but higher viscosity in the liquid phase may be obtained by further blowing at the same temperature.

A satisfactory product may be produced by blowing at the lower temperature throughout the whole period, but it has been determined that blowing at the higher temperature up to the bleach point, and then reducing the temperature, is perfectly safe and shortens the period of blowing. The time of blowing using the two temperatures above is approximately 24 hours whereas at the lower temperature the period required is 64 hours.

I am aware that if the blowing is continued until the oil jells, which may be approximately three times as long, a jelled oil having a conjugated system but widely different in physical properties will result. This oil has been described in pending application for United States patent, Serial No. 565,194 filed by Long and Ball. The table, however, will show the wide differences between this jelled product and the fluid oil of the present invention. This table further shows the differences between the original refined linseed oil and my product, as well as the similarity of my product with China-wood oil.

I have found that when my process is applied to alkali-refined soya bean oil, raw linseed oil, alkali-refined linseed oil, non-break linseed oil, steam-heated linseed oil, non-break perilla, light-pressed menhaden, hemp seed oil and pilchard oil, the product exerts satisfactory resin solvation. In the case of pilchard, menhaden, hemp seed and perilla oils, however, the blowing must be continued beyond J on the Gardner scale in order to satisfactorily dissolve the resin.

From this variety of examples it is apparent that the process of this invention is adaptable to all drying and semi-drying oils of the linseed oil type. Certain operational differences arise in the treatment of these oils. Thus, for example, when raw linseed oil is used a greater foaming results than is the case with more refined oils, and as a result certain mechanical modifications to reduce the difficulties due to foaming must be applied.

The resin selected for tests on resin solubility is a conventional cresol-aldehyde-ammonia combination and was selected because it differentiates sharply between linseed and tung oil with respect to solubility therein, and the same conditions of combining the oil with the resin were used. Other resins having similar preferential solubility for tung oil may also be used. The conjugated oil and this resin are miscible from room temperature up to the temperature of gelation which is brought about at 210° C.

Furthermore, thirty commercial resins, synthetic and natural, have been shown to be soluble in the conjugated oil. These resins include the following types: (1) phenol formaldehyde soluble in linseed oil; (2) phenol formaldehyde insoluble in linseed oil; (3) phenol formaldehyde soluble in tung oil; (4) phenol formaldehyde—modified; (5) alkyl resins of the glyptal type; (6) alkyd oil modified resins; (7) run Congo.

In all cases examined, the resin is more readily soluble in the conjugated oil and in tung oil than in the untreated oils. In some cases the conjugated oil shows better solubility than tung oil. For example, a resin of the first class above dissolved in refined linseed oil in 30 minutes at 245° C., in tung oil in 5 minutes at 180° C. and was in solution in the conjugated oil upon reaching 150° C. Another example is run Congo, which dissolves in 35 minutes in linseed oil at 220° C., in 27 minutes in tung oil at 220° C. and in 7 minutes in conjugated oil at 170° C.

The similarity between the blown oil product of this invention and tung oil is further emphasized by the fact that the product itself bodies rapidly at 280° C. and gels within fifteen minutes when heated at 310° C. which is quite similar to the action of tung oil, and quite different from that of the straight linseed oil from which it was derived.

The blowing time will vary with the temperature selected for blowing and also with the nature of the particular drying or semi-drying oil selected for blowing. However, as illustrated by the graphs, Figs. 1 to 12, I have found that the best results are obtained at temperatures between approximately 25° C. and approximately 70° C. Within this range I have found that the preferred temperatures will range from approximately 40° C. to 50° C. If the temperature is too low the time of blowing to attain the desired object is unnecessarily prolonged to the point where the process would not be commercially economical. If the temperature of blowing beyond the bleach point is too high the oil may become heat bodied or insoluble in resins, or may gel, which would render the product unsuitable for the purposes of this invention.

It may be stated generally that the broad concept of my invention comprises blowing a liquid drying or semi-drying oil of the linseed oil or non-conjugated type with an oxygen-containing gas at a temperature between approximately 25° C. and approximately 70° C. for a period of time sufficient to convert said oil to a conjugated oil having properties similar to those of tung oil including direct solubility in synthetic resins at ordinary room temperatures.

The following is a table summarizing the properties and characteristics of the oils hereinbefore discussed, and particularly comparing the blown oil of this invention relative to the original linseed oil used as a starting material, conventional China-wood oil and the gelled oil of Long and Ball.

|  | Gelled oil | My oil | China-wood oil | Original linseed oil |
|---|---|---|---|---|
| Viscosity | Gel (without solvent) | Fluid: less than J on Gardner scale. | Fluid—J to O | Fluid—A or less. |
| Oxygen content percent by weight | 20 | 11.5 | 10.9 | 10.6. |
| Iodine value, Wijs | 80 | 158 | 159–163 | 166. |
| Refractive index | 1.4928 | 1.4848 | 1.5180 | 1.4805. |
| Solubility: |  |  |  |  |
| (a) Alcohol | Soluble | Insoluble | Insoluble | Insoluble. |
| (b) Petroleum solvents | Insoluble | Soluble | Soluble | Soluble. |
| Reaction with maleic anhydride (Diels and Alder) | Yes | Yes | Yes | No. |
| Resin solubility | Soluble | Soluble | Soluble | Insoluble. |
| Nitrocellulose solubility | do | Insoluble | Insoluble | Do. |
| Acetone solubility | Partly soluble | Completely soluble | Completely soluble | Completely soluble. |
| Time of blowing at 25° C | 60 days | 40 days |  |  |
| Time of blowing at 50° C | 18 days | 6 days |  |  |
| Time of blowing at 60° C | 95 hours | 24 hours |  |  |
| Gelation | Exists as gel | Gels rapidly at 310° C | Gels rapidly at 300° C | Gels slowly at 300° C. |

By examination of the table it will be seen that the blown oil made by the procedure described is a fluid having a viscosity substantially the same as or lower than that of China-wood oil, as distinguished from the gel of Long and Ball which is non-fluid in the absence of a solvent. The oxygen content of the blown oil of this invention is slightly greater than that of the original unblown linseed oil and substantially compares with the oxygen content of the conventional China-wood oil as distinguished from that of the gel of Long and Ball, which has an oxygen content of almost double the oxygen content of conventional China-wood oil. Again, the iodine value of the blown oil of this invention is just slightly lower than the iodine value of the original unblown oil and with conventional China-wood oil, as compared with the gel of Long and Ball, which has an iodine value approximating one-half of the iodine value of the original unblown oil.

It will also be seen from examination of the table that the refractive index of the blown oil of this invention has been increased approximately .0043, whereas the refractive index of the gel of Long and Ball has been increased .0123, a striking difference. It is also to be noted that the blown oil of this invention is similar to the original unblown oil and to China-wood oil in its insolubility in alcohol and solubility in petroleum solvents as distinguished from the gel of Long and Ball which has been converted by blowing to a condition where it is soluble in alcohol and insoluble in petroleum solvents. The reaction with maleic anhydride is an indication that the oil has been converted to a conjugated system by controlled blowing in accordance with the present invention.

The blown oil of this invention has been found to have many uses. One particular use comprises a solution consisting of approximately 50 per cent of the blown oil of this invention dissolved in a cresol-aldehyde-ammonia resin for use in saturating friction material, adapted for use as clutch facings, brake linings and the like. According to one widely used process of the present day, cresol-aldehyde-ammonia resin is mixed in about equal proportion with China-wood oil and used as a saturant for the same purpose. It is necessary that the saturant be sufficiently fluid to uniformly and completely penetrate or permeate the friction material which may be as much as ⅜ of an inch thick. The saturated friction material is thereafter cured under heat to convert the saturant to a substantially infusible insoluble condition. I have found that the blown oil of this invention may be substituted for China-wood oil in the preparation of saturants for friction material as above described, and the resulting product is not only cheaper at the present time to produce, because of the lower cost of the blown oil relative to the China-wood oil, but has better properties because the uniformity of the blown oil can be definitely controlled.

Due to its good compatibility with synthetic and natural resins, as shown above, a wide variety of varnish and paint vehicles may be produced, replacing tung oil partly or wholly with this oil.

It is to be understood, of course, that while I have indicated that satisfactory solutions may be made by dissolving equal parts of the blown oil with the resin, these proportions may vary widely from 5 per cent blown oil—95 per cent resin to 5 per cent resin—95 per cent blown oil.

I claim as my invention:

1. As a new product, blown drying oil of the non-conjugated type having a conjugated system, insoluble in ethyl alcohol, soluble in petroleum solvents, and liquid at 25° C.

2. As a new product, a blown drying oil of the non-conjugated type having a conjugated system, soluble in resins of the type selected from the group consisting of phenol formaldehyde soluble in linseed oil, phenol formaldehyde insoluble in linseed oil, phenol formaldehyde soluble in tung oil, modified phenol formaldehyde, alkyd resins of the glyptal type, alkyd oil modified resins, and run Congo.

3. As a new product, a blown drying oil of the non-conjugated type having a conjugated system and soluble at ordinary room temperatures in a cresol-aldehyde-ammonia resin.

4. As a new product, a blown linseed oil having a conjugated system, insoluble in alcohol and soluble in petroleum solvents.

5. As a new product, a solution fluid at room temperatures comprising essentially a synthetic resin and a liquid conjugated drying oil derived by the addition of oxygen to a non-conjugated drying oil.

6. A process, which comprises blowing a drying oil of the straight chain, non-conjugated type with an oxygen containing gas at a temperature between 25° C. and 70° C. for a period of time sufficient to convert said oil to a conjugated system soluble in synthetic resin and petroleum solvents but insoluble in alcohol stopping the reaction when said oil has been so converted, and recovering the oil resulting from said conversion as the product of the process.

7. The method which comprises treating a drying oil of the straight chain, non-conjugated type with an oxygen containing gas at temperatures between 25° C. and 70° C. for a period of time sufficient to convert said oil to a conjugated system soluble in synthetic resin, stopping the reaction before said oil has lost its property of solubility in petroleum solvents and its insolubility in alcohol, and recovering the treated oil as the product of the process.

8. The process of treating drying oils of the straight chain, non-conjugated type to convert said oil to a conjugated system which comprises blowing said oil with an oxygen containing gas at a temperature between 25° C. and 70° C., continuing such treatment until the oil has become soluble in synthetic resin, then stopping the treatment before said oil has lost its property of solubility in petroleum solvents and its insolubility in alcohol, and recovering the treated oil as the product of the process.

9. The process of treating a drying oil of the straight chain, non-conjugated type which comprises blowing such oil with an oxygen containing gas at temperatures between 25° C. and 70° C. for a time sufficient to convert said oil to a conjugated system insoluble in synthetic resin, stopping the treatment before said oil has lost its fluidity and recovering the fluid blown product.

10. A process of treating drying oils of the type which do not react with maleic anhydride which comprises blowing said oil with an oxygen containing gas at a temperature between 25° C. and 70° C. until such oil reacts with maleic anhydride and becomes soluble in synthetic resin, stopping the treatment before said oil has lost its fluidity and recovering the liquid product thus formed.

11. As a new product, a liquid conjugated drying oil derived by the addition of oxygen to a non-conjugated drying or semi-drying oil selected from the group consisting of linseed oil, pilchard oil, hempseed oil, perilla oil, menhaden oil and soya bean oil, insoluble in ethyl alcohol and soluble in petroleum solvents.

12. A conjugated drying oil derivative similar in viscosity, density, color and odor to the natural drying oil from which it was derived, but containing 1 to 2% more oxygen, having an increased refractive index and greater solution power for resins.

IZADOR J. NOVAK.